US012556050B2

(12) United States Patent
Kim et al.

(10) Patent No.: US 12,556,050 B2
(45) Date of Patent: Feb. 17, 2026

(54) ROTOR INTEGRATED WITH SENSING MAGNET

(71) Applicant: CNM CO., LTD., Gyeongsangnam-do (KR)

(72) Inventors: Chan Hui Kim, Gyeongsangnam-do (KR); Yeo Eun Yun, Gyeonggi-do (KR); Sun Haeng Kim, Busan (KR)

(73) Assignee: CNM CO., LTD., Gyeongsangnam-do (KR)

( * ) Notice: Subject to any disclaimer, the term of this patent is extended or adjusted under 35 U.S.C. 154(b) by 231 days.

(21) Appl. No.: 18/278,396

(22) PCT Filed: May 12, 2021

(86) PCT No.: PCT/KR2021/005962
§ 371 (c)(1),
(2) Date: Aug. 22, 2023

(87) PCT Pub. No.: WO2022/181883
PCT Pub. Date: Sep. 1, 2022

(65) Prior Publication Data
US 2024/0128817 A1    Apr. 18, 2024

(30) Foreign Application Priority Data
Feb. 23, 2021 (KR) .......... 10-2021-0023917

(51) Int. Cl.
*H02K 11/00* (2016.01)
*H02K 1/278* (2022.01)
(Continued)

(52) U.S. Cl.
CPC ............. *H02K 1/278* (2013.01); *H02K 1/28* (2013.01); *H02K 11/215* (2016.01)

(58) Field of Classification Search
CPC ........ H02K 1/278; H02K 1/28; H02K 11/215; H02K 1/276; H02K 7/003; H02K 21/12
See application file for complete search history.

(56) References Cited

U.S. PATENT DOCUMENTS

2009/0275273 A1*  11/2009  Purohit ............... B24B 23/03
                                                                 29/605
2023/0050704 A1*   2/2023  Oh ......................... H02K 1/28

FOREIGN PATENT DOCUMENTS

KR        200198154       10/2000
KR      1020130012443      2/2013
(Continued)

*Primary Examiner* — Thomas Truong
(74) *Attorney, Agent, or Firm* — JCIPRNET

(57) ABSTRACT

A rotor integrated with a sensing magnet including: a rotor core; two or more permanent magnets; a shaft; a magnet protector; and a disc-shaped magnet plate. The rotor core includes mounting portions, and steel plates. The two or more permanent magnets are inserted into the mounting portions circumferentially disposed on the outer circumferential surface of the rotor core. The shaft is inserted into a coupling hole formed along a central axis of the rotor core and transmits rotational power to a load. The magnet protector is provided on the outer circumferential surfaces of the permanent magnets. The disc-shaped magnet plate, which is provided perpendicular to the shaft, is provided on one side of the rotor core, and includes a magnet mounting rail portion having a shape corresponding to a ring-shaped sensing magnet.

8 Claims, 4 Drawing Sheets

(51) Int. Cl.
*H02K 1/28* (2006.01)
*H02K 11/215* (2016.01)

(56) References Cited

FOREIGN PATENT DOCUMENTS

| KR | 1020170045998 | 4/2017 |
| KR | 1020170048015 | 5/2017 |
| KR | 1020170126661 | 11/2017 |
| KR | 1020170140716 | 12/2017 |
| KR | 1020180085494 | 7/2018 |
| KR | 1020190014742 | 2/2019 |

\* cited by examiner

ROTOR INTEGRATED WITH SENSING MAGNET

TECHNICAL FIELD

The present disclosure relates to a rotor integrated with a sensing magnet and, in detail, a configuration that prevents separation of a permanent magnet by providing a magnet protector on the outer circumferential surface of the permanent magnet in order to break with the engineering method of coupling and fixing a permanent magnet using an adhesive to prevent the separation of the permanent magnet in an axial or circumferential direction.

BACKGROUND ART

A rotation principle of a rotor based on variation of polarity of the rotor and polarity of the stator is used in a motor.

In order to impart a polarity to a stator and a rotor, there are methods of using a permanent magnet 20 and of imparting a polarity by winding an excitation coil and using an applied current.

In the rotors of motors using a permanent magnet 20, there is a type of attaching a plurality of permanent magnets 20 in a segmented manner on the outer surface of a rotor core.

In these rotors, in general, protrusions for determining the assembly positions of permanent magnets 20 are disposed on the outer circumferential surface of a rotor core, and the permanent magnets 20 are fixed at regular intervals on the outer circumferential surface of the rotor core by an adhesive with both sides supported by the protrusions.

Since the assembly structure of a permanent magnet 20 using an adhesive requires additional processes of applying an adhesive to the permanent magnet 20 and of hardening the adhesive, there is limitation in improving assemblability of the permanent magnet 20.

Further, a permanent magnet 20 that is bonded to a rotor core by an adhesive has a problem that the permanent magnet 20 becomes unstable due to a twist of the permanent magnet 20 from the assembled position during the hardening process of the adhesive.

SUMMARY OF INVENTION

Technical Problem

The present disclosure has been made in an effort to solve the problems of the related art described above, and an objective of the present disclosure is to provide a configuration that prevents the separation of a permanent magnet 20 in an axial or circumferential direction and also prevents separation of a magnet protector 40 provided on the outer circumferential surface of the permanent magnet 20.

Another objective is to provide a structure that can simplify complicated processes, such as fixing a permanent magnet 20 using an adhesive and drying the adhesive, in a method of fixing the permanent magnet 20 on the outer circumferential surface of a rotor and that can structurally maintain the quality constant.

Solution to Problem

In order to achieve the objectives, an embodiment of the present disclosure provides a rotor integrated with a sensing magnet 60 including: a rotor core 10 including mounting portions 100, which are formed by stacking, in the axial direction, steel plates and have two or more permanent magnets 20 mounted on the outer circumferential surface thereof, and mounting protrusion portions 110 for fixing the position at both ends of the permanent magnets 20; two or more permanent magnets 20 inserted into the mounting portions 100 circumferentially disposed on the outer circumferential surface of the rotor core 10; a shaft 30 inserted into a coupling hole formed along a central axis of the rotor core 10 and transmits rotational power to a load; a magnet protector 40 provided on the outer circumferential surfaces of the permanent magnets 20, prevents separation of the permanent magnets 20 by pushing the permanent magnets 20 toward an axial center, and prevents the permanent magnets 20 from axially separating up and down; and a disc-shaped magnet plate 60, which is provided perpendicular to the shaft 30, is provided on one side of the rotor core 10, and includes a magnet mounting rail 500 having a shape corresponding to a ring-shaped sensing magnet 60 so that the sensing magnet 60 can be mounted, wherein an outer diameter portion 50-1 of the magnet plate 50 extends up to outer circumferential surfaces 20-1 of one end of the permanent magnets 20, so that separation of the permanent magnets 20 therefrom is prevented.

The magnet protector 40 is formed in a cylindrical shape with both open ends, wherein one end has a plate coupling portion 410 formed to be able to come in contact with an outer circumferential surface of the magnet plate 50 up to a predetermined height, and the other end is bent to be positioned at a predetermined inner diameter portion of the rotor core 10 and has a magnet separation preventing bent portion 420 that prevents separation of the permanent magnets (20).

The magnet plate 50 has: a coupling boss 510 that is protruded to be coupled by being inserted by a predetermined depth in a plurality of slots formed at the rotor core 10 and prevent separation; and a mounting rail portion 500 in which a magnet having a position and a shape corresponding to the sensing magnet 60 having a ring shape with a rectangular cross-section is mounted, and the magnet plate 50 is combined with the magnet protector 40, thereby fixing the position of the permanent magnets 20 and preventing separation of the permanent magnets 20.

The mounting rail portion 500 is formed to surround an inner circumferential surface and an outer circumferential surface of the sensing magnet 60 with a rectangular cross-section up to a predetermined height, and a coupling groove that is cut deeper than a mounting surface is further formed at both edges of the mounting surface on which the sensing magnet 60 is mounted. When the sensing magnet 60 is coupled to the mounting rail portion 500, a predetermined adhesive paint is applied to the inner surface of the mounting rail portion 500 to fix the sensing magnet 60, and the adhesive is uniformly applied through the coupling groove.

An end portion of the magnet plate 50 is in contact with an inner circumferential surface of one end of the magnet protector 40, and the end portion of the magnet plate 50 is formed to have a predetermined curvature, so the magnet plate 50 is pressed and fixed by bending an end portion of the magnet protector 40 in one direction after being coupled with the magnet protector 40.

An end portion of the separation preventing bent portion 420 is bent toward the central axis of the rotor core 10 in a direction perpendicular to an outer circumferential surface of the magnet protector 40, thereby preventing axial separation of the permanent magnets 20 disposed between the rotor core 10 and the magnet protector 40.

The separation preventing bent portion 420 has a spare portion 421 bent to provide a predetermined internal space between the outer circumferential surface and the bent end portion of the magnet protector 40, and the spare portion 421 provides a storage space of an adhesive that is applied between the rotor core 10 and the permanent magnets 20, or a space for absorbing a gap due to a difference that is generated when the rotor core 10 having the permanent magnets 20 and the magnetic protector 40 are combined.

The magnet protector 40 is fixed and coupled with the magnet plate 50 by an end portion of the bent portion being in close contact with one side of the rotor core 10, and the plate coupling portion 410 being in contact with the end portion of the outer circumferential surface of the magnet plate 50 and bent toward the axial center.

The magnet protector 40 is provided on the outer circumferential surfaces of the permanent magnets 20, the end portion of the bent portion is in contact with one side of the rotor core 10, and the plate coupling portion 410 is coupled by being bent toward the axial center at the end portion of the magnet plate 50 provided on the other side of the rotor core 10.

Advantageous Effects of Invention

According to the configurations described above, the present disclosure has an advantage of preventing the separation of the permanent magnets 20 in axial or circumferential direction and also preventing the separation of the magnet protector 40 disposed on the outer circumferential surfaces of the permanent magnets 20.

Further, the present disclosure has an advantage that it is possible to dramatically reduce the trouble of adding the processes of fixing permanent magnets 20 with an adhesive and drying the adhesive and to reduce time and economic loss in a method of fixing the permanent magnets 20 to the outer surface of a rotor.

DESCRIPTION OF EMBODIMENTS

Hereinafter, detailed embodiments of the present disclosure will be described with reference to the drawings. However, the spirit of the present disclosure is not limited to the proposed embodiments and other embodiments may be easily proposed by those skilled in the art without departing from the scope of the present disclosure.

FIGS. 1 to 5 are views showing all or main components of a rotor integrated with a sensing magnet 60 according to an embodiment of the present disclosure.

Figure 1:
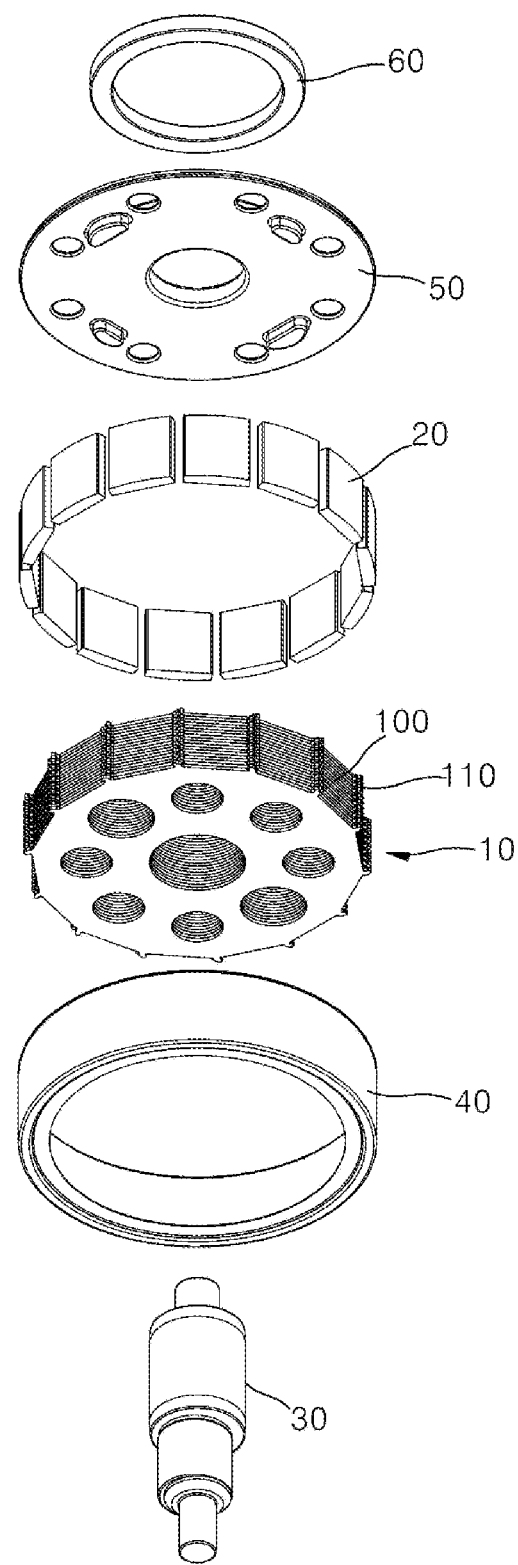
FIGS. 1 to 5 are views showing all or main components of a rotor integrated with a sensing magnet 60 according to an embodiment of the present disclosure.
Figure 2:
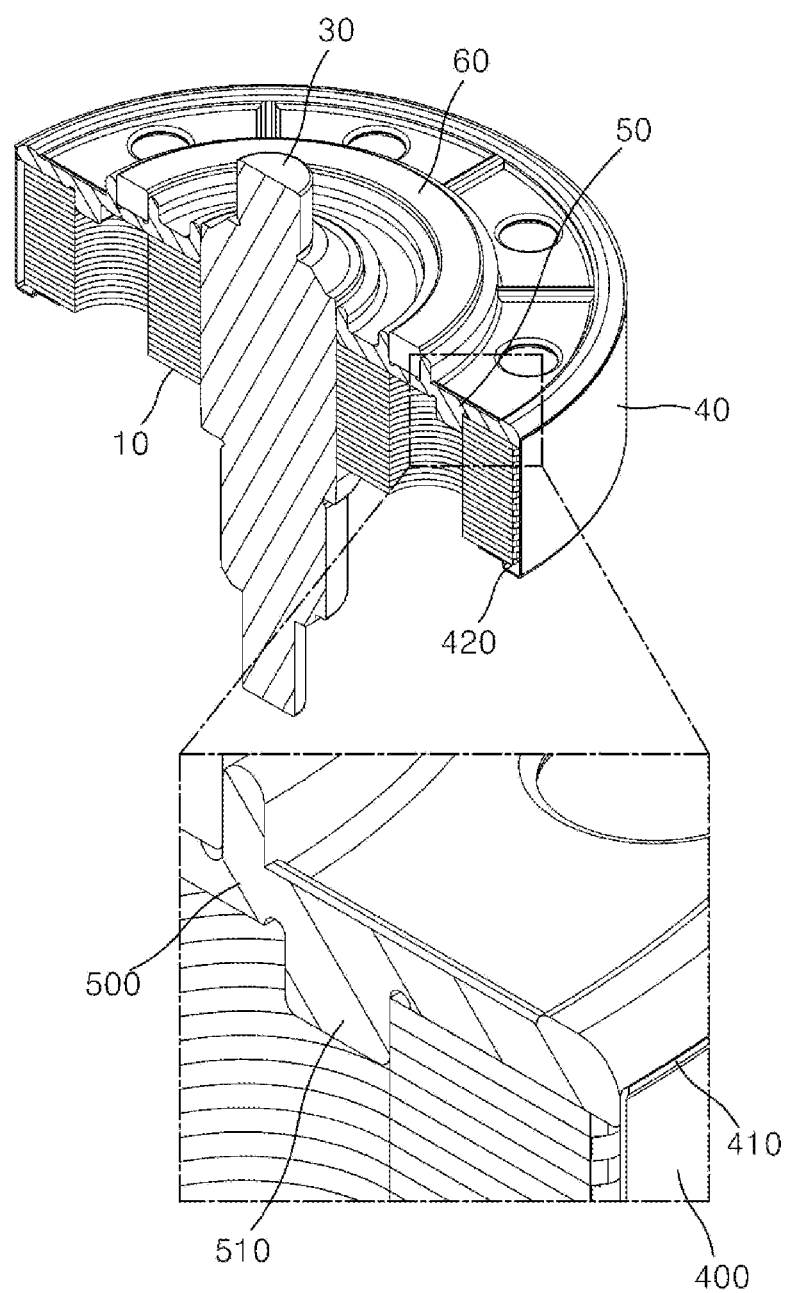
Figure 3:
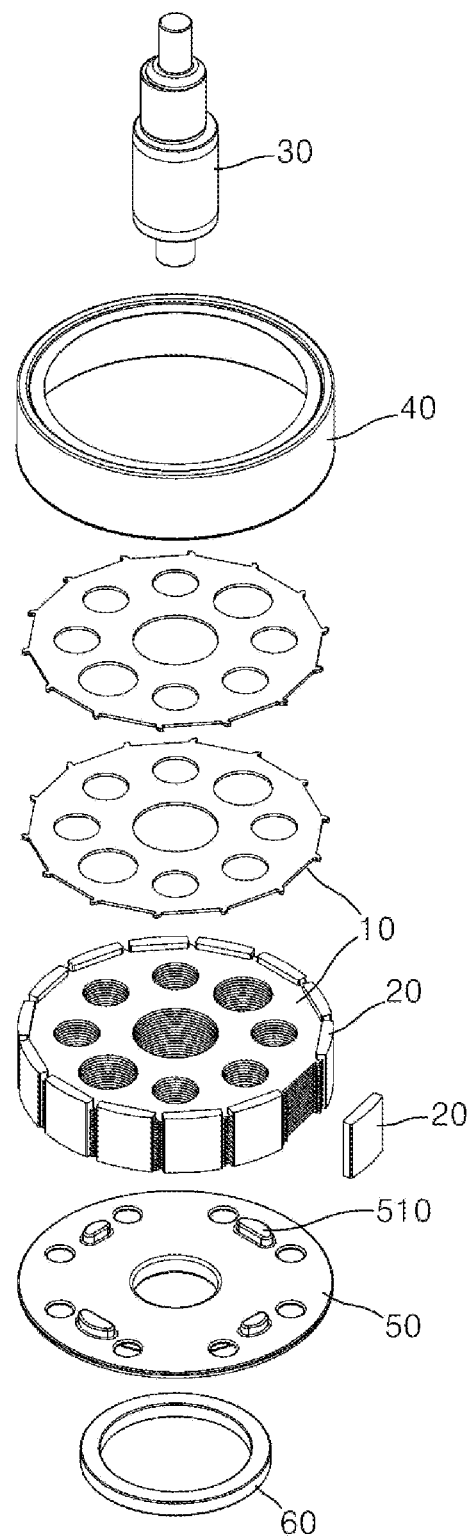
Figure 4:
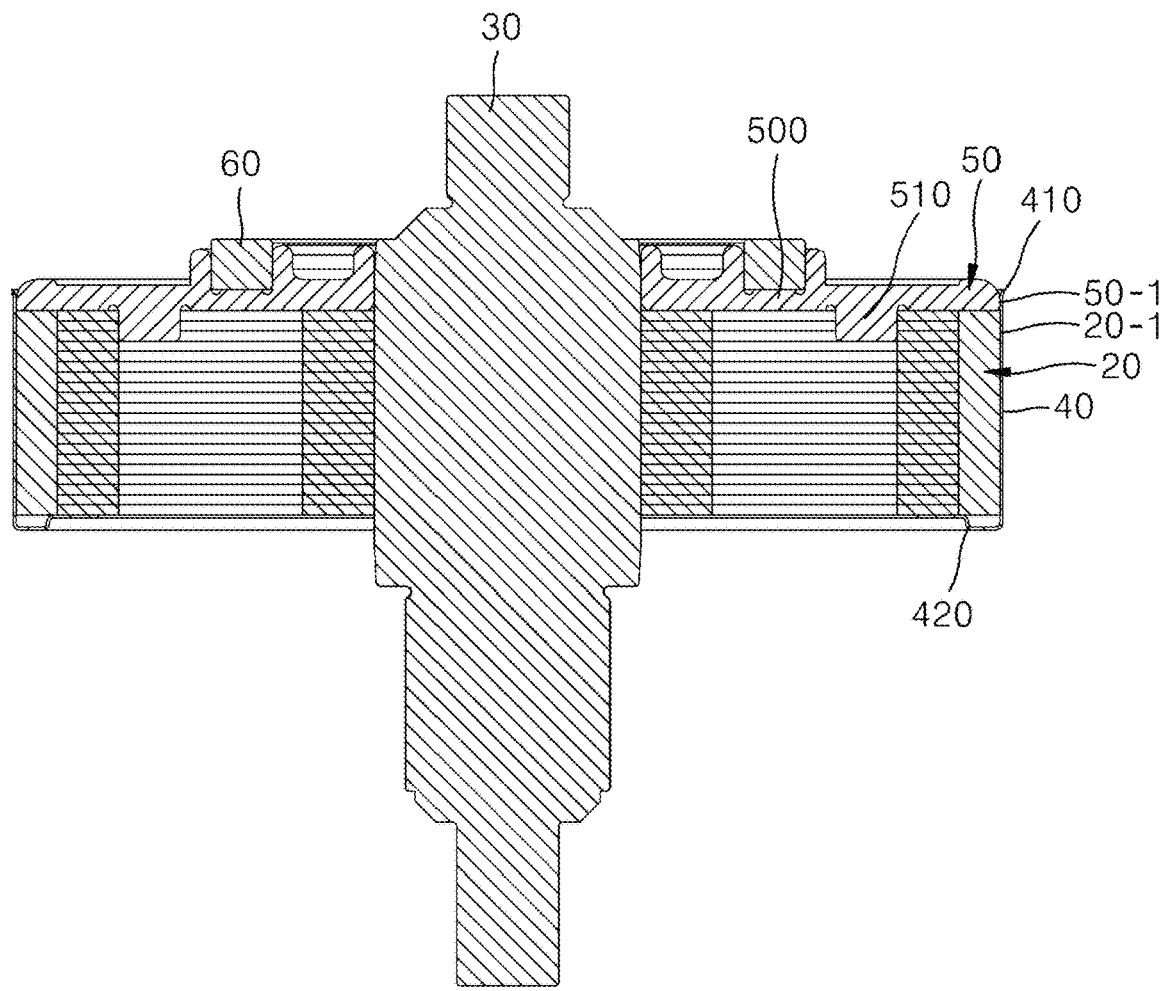
Figure 5:
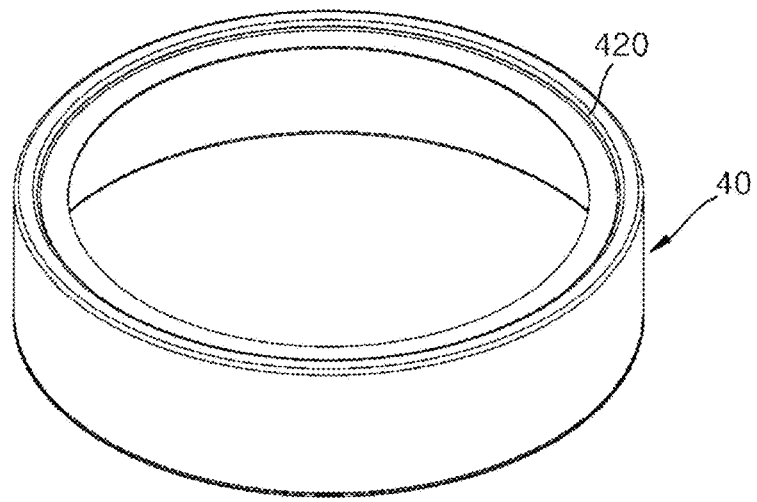

FIG. 1 is an exploded perspective view showing main components constituting a rotor integrated with a magnet according to an embodiment of the present disclosure.

A rotor integrated with a magnet according to an embodiment of the present disclosure includes: a rotor core 10 including mounting portions 100, which are formed by stacking, in the axial direction, steel plates and have two or more permanent magnets 20 mounted on the outer circumferential surface thereof, and mounting protrusion portions 110 for fixing the position at both ends of the permanent magnets 20; two or more permanent magnets 20 inserted into the mounting portions 100 circumferentially disposed on the outer circumferential surface of the rotor core 10; a shaft 30 inserted into a coupling hole formed along the central axis of the rotor core 10 and transmits rotational power to a load; a magnet protector 40 provided on the outer circumferential surface of the permanent magnets 20, prevents separation of the permanent magnets 20 by pushing the permanent magnets 20 toward the axial center, and prevents the permanent magnets 20 from axially separating up and down; and a disc-shaped magnet plate 60, which is provided perpendicular to the shaft 30, is provided on one side of the rotor core 10, and includes a magnet mounting rail portion 500 having a shape corresponding to a ring-shaped sensing magnet 60 so that the sensing magnet 60 can be mounted.

The rotor core 10 is formed by punching steel plates having a predetermined thickness into a circular shape having predetermined inner diameter and outer diameter and then stacking the steel plates by a predetermined thickness.

The shaft 30 is coupled by being inserted in the inner hole of the stacked rotor core 10. Coupling with the shaft 30 is performed through various engineering methods such as thermal fitting, forcible fitting using a tolerance, etc., or the like.

A mounting space in which the permanent magnets 20 can be mounted is formed on the outer diameter side of the rotor core 10. Meanwhile, a plurality of permanent magnets 20 is formed in an oblong shape and mounted on the outer diameter side of the rotor core 10.

It is more preferable to form protrusions, which fix the positions of the permanent magnets 20 at regular interval and prevent separation of the permanent magnets 20 in circumferential direction, between the permanent magnets 20.

Further, the outer diameter side of the magnet plate 50 provided on one side of the rotor core 10 extends up to the outer circumferential surfaces of one end of the permanent magnets 20, thereby additionally preventing separation of the permanent magnets 20.

When the permanent magnets 20 are mounted on the outer diameter side of the rotor core 10, the cylindrical magnet protector 40 is fitted in the axial direction and mounted while surrounding the outer circumferential surfaces of the permanent magnets 20.

Meanwhile, the magnet protector 40 is formed in a cylindrical shape with both open ends, in which one end has a plate coupling portion 410 to come in contact with the outer circumferential surface of the magnetic plate 50 up to a predetermined height and the other end is bent to be positioned at a predetermined inner diameter portion of the rotor core 10.

In this configuration, a magnet separation preventing bent portion 420 that prevents separation of the permanent magnet 20 is formed at one side of the magnet protector 40.

In detail, the end portion of the separation preventing bent portion 420 is bent toward the central axis of the rotor core 10 in a direction perpendicular to the outer circumferential surface of the magnet protector 40, thereby preventing axial separation of the permanent magnets 20 provided between the rotor core 10 and the magnet protector 40.

Further, the separation preventing bent portion 420 has a spare portion 421 bent to provide a predetermined internal space between the outer circumferential surface and the bent end portion of the magnet protector 40.

In this configuration, the spare portion 421 provides a storage space of an adhesive that is applied between the rotor core 10 and the permanent magnets 20, or a space for absorbing a gap due to a difference that is generated when the rotor core 10 having the permanent magnets 20 and the magnetic protector 40 are combined.

Meanwhile, the substantially disc-shaped magnet plate 50 is mounted and coupled to one side of the rotor core 10.

In this configuration, the magnet plate 50 has a coupling boss 510 that is protruded to be coupled by being inserted by a predetermined depth in a plurality of slots formed at the rotor core 10 and to prevent separation, and a mounting rail portion 500 in which a magnet having a position and a shape corresponding to the sensing magnet 60 having a ring shape with a rectangular cross-section is mounted.

The magnet plate 50 is combined with the magnet protector 40, thereby fixing the position of the permanent magnets 20 and preventing axial separation of the permanent magnets 20.

In this configuration, the mounting rail 500 is formed to surround the inner circumferential surface and the outer circumferential surface of the sensing magnet 60 having a ring shape with a rectangular cross-section up to a predetermined height, and a coupling groove that is cut deeper than a mounting surface is further formed at both edges of the mounting surface on which the sensing magnet 60 is mounted.

The ring-shaped sensing magnet 60 is mounted in the mounting rail portion 500, thereby fulfilling a role of sensing a position according to rotation of the rotor.

The sensing magnet 60 is provided in the same gap and same number as drive magnets and has a function that the position of the rotor is sensed by the magnetic flux of the sensing magnet 60 being sensed by a Hall sensor.

When the sensing magnet 60 having this function is coupled to the mounting rail portion 500, a predetermined adhesive paint is applied to the inner surface of the mounting rail portion 500 so that the sensing magnet can be sensed or to facilitate easy coupling between the edge of the inner surface or the outer surface of the sensing magnet 60 and the corresponding portion of the mounting rail portion 500.

Meanwhile, an end portion of the magnet plate 50 is in contact with the inner circumferential surface of an end of the magnet protector 40.

In this configuration, the end portion of the magnet plate 50 is formed to have a predetermined curvature, so the magnet plate 50 is pressed and fixed by bending an end portion of the magnet protector 40 in one direction after being coupled with the magnet protector 40.

The portion coupled between the magnet protector 40 and the magnet plate 50 is fixed and coupled by bending the end portion of the magnet protector 40 toward the magnet plate 50.

According to the configurations described above, the present disclosure has a structure that prevents the separation of the permanent magnets 20 in axial or circumferential direction and also prevents separation of the magnet protector 40 provided on the outer circumferential surfaces of the permanent magnets 20.

Further, the present disclosure provides a configuration that dramatically reduces the trouble of adding the processes of fixing permanent magnets 20 with an adhesive and drying the adhesive, and reduces time and economic loss in a method of fixing the permanent magnets 20 to the outer surface of a rotor.

In order to achieve the objectives described above, the end portion of the separation preventing bent portion 420 is bent toward the central axis of the rotor core 10 in a direction perpendicular to the outer circumferential surface of the magnet protector 40.

According to this configuration, there is provided a configuration that prevents axial separation of the permanent magnets 20 disposed between the rotor core 10 and the magnet protector 40.

Further, the separation preventing bent portion 420 further has a spare portion 421 bent to provide a predetermined internal space between the outer circumferential surface and the bent end portion of the magnet protector 40.

The spare portion 421 provides a storage space of an adhesive that is applied between the rotor core 10 and the permanent magnets 20, or a space for absorbing a gap due to a difference that is generated when the rotor core 10 having the permanent magnets 20 and the magnetic protector 40 are combined.

In this configuration, the magnet protector 40 is fixed and coupled with the magnet plate 50 by an end portion of the bent portion being in close contact with one side of the rotor core 10, and the plate coupling portion 410 being in contact with the end portion of the outer circumferential surface of the magnet plate 50 and bent toward the axial center.

Further, the magnet protector 40 is provided on the outer circumferential surfaces of the permanent magnets 20, the end portion of the bent portion is in contact with one side of the rotor core 10, and the plate coupling portion 410 is coupled by being bent toward the axial center at the end portion of the magnet plate 50 provided on the other side of the rotor core 10.

When the structure of the rotor having the permanent magnets 20 and the sensing magnet 60 has the configuration according to an embodiment of the present disclosure described above, there is provided a configuration that not only can dramatically resolve the time or economic loss due to use of an adhesive as a process of fixing the permanent magnets 20 to the rotor core 10, but can solve at once the problem of concerns about the quality due to separation of the permanent magnets 20 by non-uniform applying or aging of an adhesive.

REFERENCE SIGNS LIST

10: Rotor core
20: Permanent magnet
30: Shaft
40: Magnet protector
50: Magnet plate
60: Sensing magnet
100: Mounting portion
110: Mounting protrusion portion
410: Plate coupling portion
420: Separation preventing bent portion
421: Spare portion
500: Mounting rail portion
510: Coupling boss

The invention claimed is:

1. A rotor integrated with a sensing magnet (60) comprising:
  a rotor core (10) including mounting portions (100), which are formed by stacking, in the axial direction, steel plates and have two or more permanent magnets (20) mounted on the outer circumferential surface thereof, and mounting protrusion portions (110) for fixing the position at both ends of the permanent magnets (20);
  two or more permanent magnets (20) inserted into the mounting portions (100) circumferentially disposed on the outer circumferential surface of the rotor core (10);

a shaft (30) inserted into a coupling hole formed along a central axis of the rotor core (10) and transmits rotational power to a load;

a magnet protector (40) provided on the outer circumferential surfaces of the permanent magnets (20), prevents separation of the permanent magnets (20) by pushing the permanent magnets (20) toward an axial center, and prevents the permanent magnets (20) from axially separating up and down; and a disc-shaped magnet plate (50), which is provided perpendicular to the shaft (30), is provided on one side of the rotor core (10), and includes a magnet mounting rail portion (500) having a shape corresponding to a ring-shaped sensing magnet (60) so that the sensing magnet (60) can be mounted, wherein an outer diameter portion (50-1) of the magnet plate (50) extends up to outer circumferential surfaces (20-1) of one end of the permanent magnets (20) so that separation of the permanent magnets (20) therefrom is prevented, wherein the magnet protector (40) is formed in a cylindrical shape with both open ends, wherein one end has a plate coupling portion (410) formed to be able to come in contact with an outer circumferential surface of the magnet plate (50) up to a predetermined height, and the other end is bent to be positioned at a predetermined inner diameter portion of the rotor core (10) and has a magnet separation preventing bent portion (420) that prevents separation of the permanent magnets (20).

2. The rotor integrated with a sensing magnet (60) according to claim 1, wherein the magnet plate (50) has:

a coupling boss (510) that is protruded to be coupled by being inserted by a predetermined depth in a plurality of slots formed at the rotor core (10) and prevents separation; and a mounting rail portion (500) in which a magnet having a position and a shape corresponding to the sensing magnet (60) having a ring shape with a rectangular cross-section is mounted, and the magnet plate (50) is combined with the magnet protector (40), thereby fixing the position of the permanent magnets (20) and preventing separation of the permanent magnets (20).

3. The rotor integrated with a sensing magnet (60) according to claim 2, wherein the mounting rail portion (500) is formed to surround an inner circumferential surface and an outer circumferential surface of the sensing magnet (60) with a rectangular cross-section up to a predetermined height, and a coupling groove that is cut deeper than a mounting surface is further formed at both edges of the mounting surface on which the sensing magnet (60) is mounted;

when the sensing magnet (60) is coupled to the mounting rail portion (500), a predetermined adhesive paint is applied to the inner surface of the mounting rail portion (500) to fix the sensing magnet (60) and the adhesive is uniformly applied through the coupling groove.

4. The rotor integrated with a sensing magnet (60) according to claim 2, wherein an end portion of the magnet plate (50) is in contact with an inner circumferential surface of one end of the magnet protector (40), and the end portion of the magnet plate (50) is formed to have a predetermined curvature, so the magnet plate (50) is pressed and fixed by bending an end portion of the magnet protector (40) in one direction after being coupled with the magnet protector (40).

5. The rotor integrated with a sensing magnet (60) according to claim 1, wherein an end portion of the separation preventing bent portion (420) is bent toward the center axis of the rotor core (10) in a direction perpendicular to an outer circumferential surface of the magnet protector (40), thereby preventing axial separation of the permanent magnets (20) disposed between the rotor core (10) and the magnet protector (40).

6. The rotor integrated with a sensing magnet (60) according to claim 5, wherein the separation preventing bent portion (420) has a spare portion (421) bent to provide a predetermined internal space between the outer circumferential surface and the bent end portion of the magnet protector (40), and the spare portion (421) provides a storage space of an adhesive that is applied between the rotor core (10) and the permanent magnets (20), or a space for absorbing a gap due to a difference that is generated when the rotor core (10) having the permanent magnets (20) and the magnetic protector (40) are combined.

7. The rotor integrated with a sensing magnet (60) according to claim 6, wherein the magnet protector (40) is fixed and coupled with the magnet plate 50 by an end portion of the bent portion being in close contact with one side of the rotor core (10), and the plate coupling portion (410) being in contact with the end portion of the outer circumferential surface of the magnet plate 50 and bent toward the axial center.

8. The rotor integrated with a sensing magnet (60) according to claim 7, wherein the magnet protector (40) is provided on the outer circumferential surfaces of the permanent magnets (20), the end portion of the bent portion is in contact with a side of the rotor core (10), and the plate coupling portion (410) is coupled by being bent toward the axial center at the end portion of the magnet plate (50) provided on the other side of the rotor core (10).

* * * * *